(12) United States Patent
Starr

(10) Patent No.: US 6,263,285 B1
(45) Date of Patent: Jul. 17, 2001

(54) AMPLITUDE SPECTRA ESTIMATION

(75) Inventor: Joel Starr, Richmond, TX (US)

(73) Assignee: PGS Tensor, Inc., Houston, TX (US)

( * ) Notice: Subject to any disclaimer, the term of this patent is extended or adjusted under 35 U.S.C. 154(b) by 0 days.

(21) Appl. No.: 09/396,600

(22) Filed: Sep. 15, 1999

(51) Int. Cl.$^7$ ................................................ G01V 1/28
(52) U.S. Cl. ........................................................ 702/17
(58) Field of Search ........................ 702/17, 14; 367/24, 367/39, 38

(56) References Cited

U.S. PATENT DOCUMENTS

| | | |
|---|---|---|
| 3,629,801 | 12/1971 | Brede . |
| 4,598,391 * | 7/1986 | Muir ........................................ 367/25 |
| 4,752,916 | 6/1988 | Loewenthal . |
| 4,887,243 | 12/1989 | Pann . |
| 4,918,668 | 4/1990 | Sallas . |
| 4,979,150 | 12/1990 | Barr . |
| 5,163,028 | 11/1992 | Barr et al. . |
| 5,235,554 | 8/1993 | Barr et al. . |
| 5,400,299 * | 3/1995 | Trantham ............................... 367/38 |
| 5,696,734 | 12/1997 | Corrigan . |
| 5,754,492 * | 5/1998 | Starr ....................................... 367/24 |
| 5,825,716 * | 10/1998 | Starr ....................................... 367/24 |
| 5,991,238 * | 11/1999 | Barr ....................................... 367/24 |

OTHER PUBLICATIONS

Loewenthal, et al., "*Source Signature Estimation using Fictitious Source and Reflector,*" Geophysics, vol. 54, No. 7, Jul. 1989, pp. 916–920.

Lowenthal, et al., "*Deterministic Estimation of a Wavelet Using Impedance Type Technique,*" Geophysical Prospecting 33, 1985, pp. 956–969.

Fricke, et al., "*A Standard Quantitative Calibration Procedure for Marine Seismic Sources,*" Geophysics, vol. 50, No. 10, Oct. 1985, pp. 1525–1532.

* cited by examiner

*Primary Examiner*—Donald E. McElheny, Jr.
(74) *Attorney, Agent, or Firm*—Arnold & Associates

(57) ABSTRACT

A method and system of amplitude spectra estimation for seismic data using up-going and down-going wavefields includes gathering up-going and down-going wavefields, separating the up-going and the down-going wavefields from each other and crosscorrelating the up-going wavefields and the down-going wavefields. From the result of the crosscorrelation of the up-going wavefields and the down-going wavefields, an estimate of the amplitude spectra in the frequency domain of the seismic data can be obtained. In this method for amplitude spectra estimation, the gathering may include or may be accomplished by providing pressure and particle velocity detectors to distinguish between the up-going and the down-going wavefields. Also, in this method for amplitude spectra estimation, the gathering may include measuring the down-going waves and the separating may include removing the down-going waves from the seismic data. In the alternative, this method for amplitude spectra estimation, the gathering may include measuring the up-going waves and the separating may include removing the up-going waves from the seismic data.

19 Claims, 20 Drawing Sheets

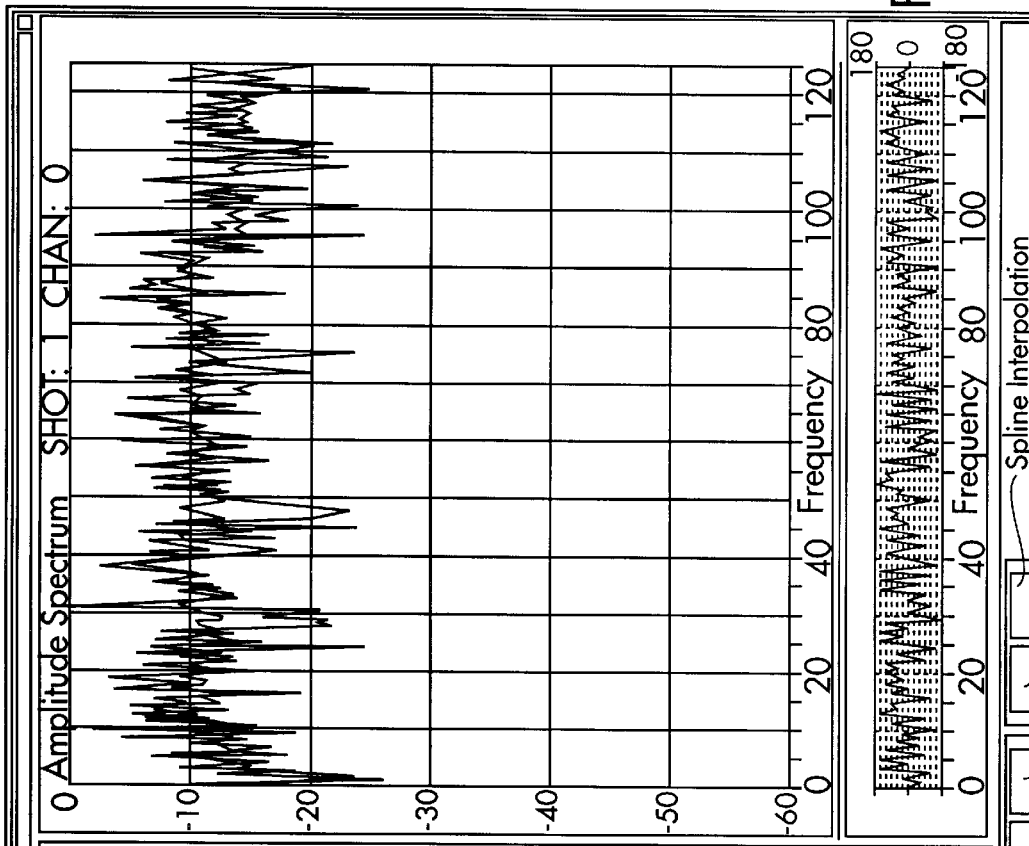
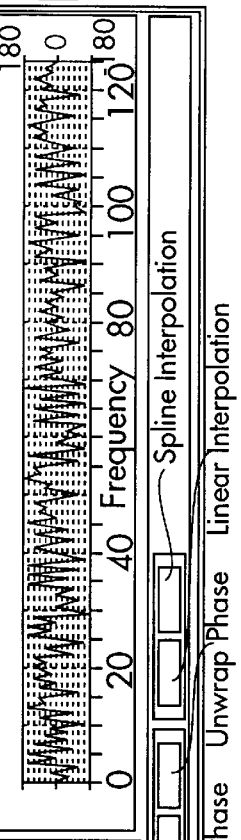
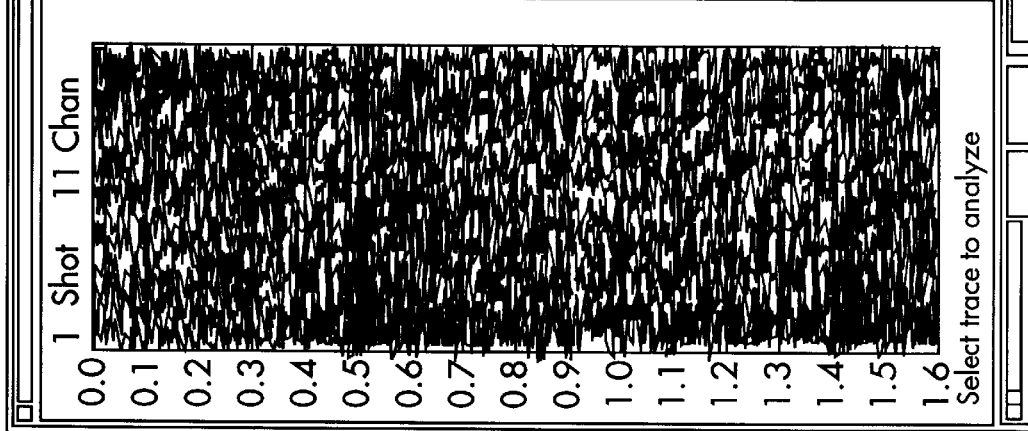
FIG. 16B
FIG. 16C
FIG. 16A

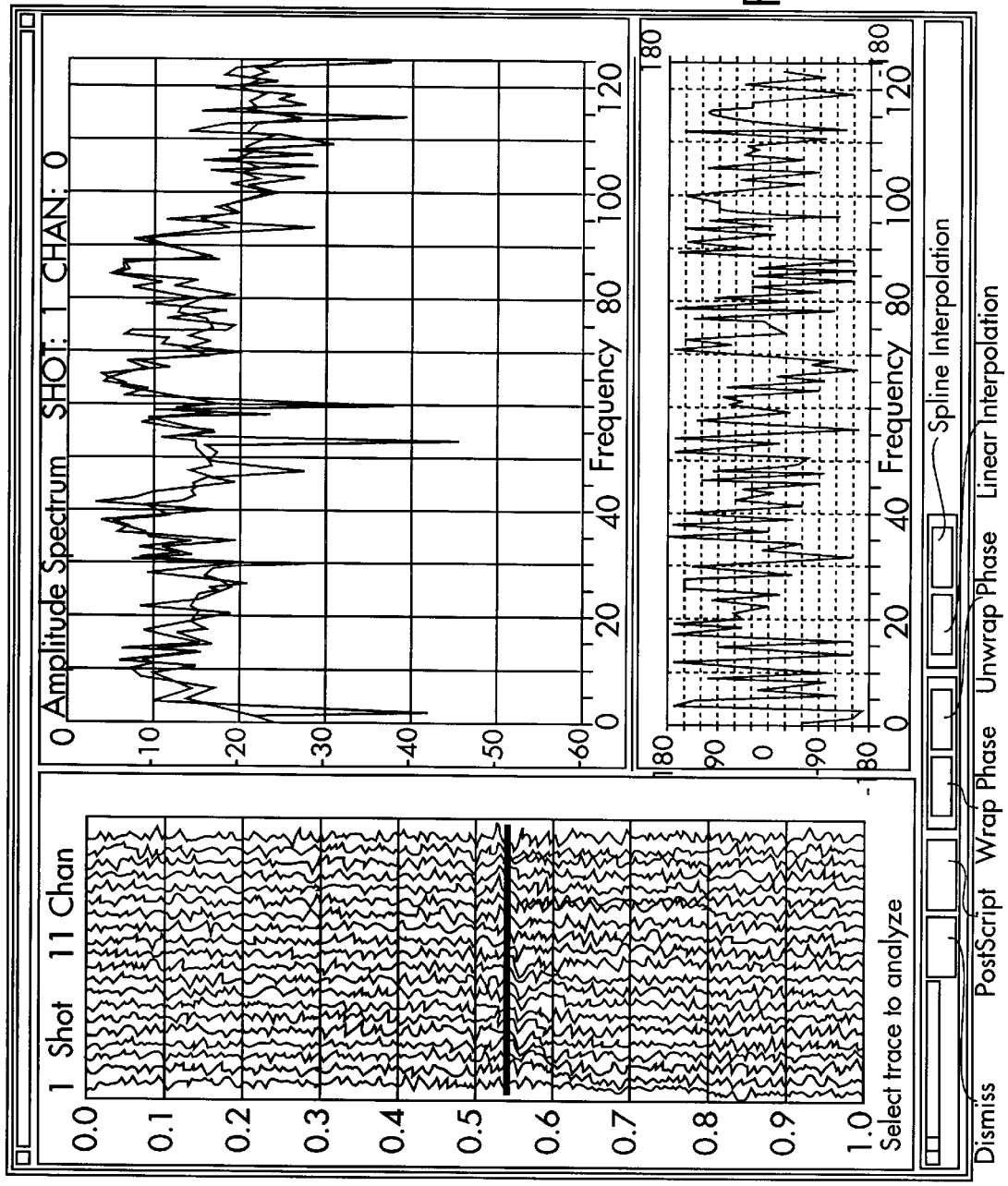

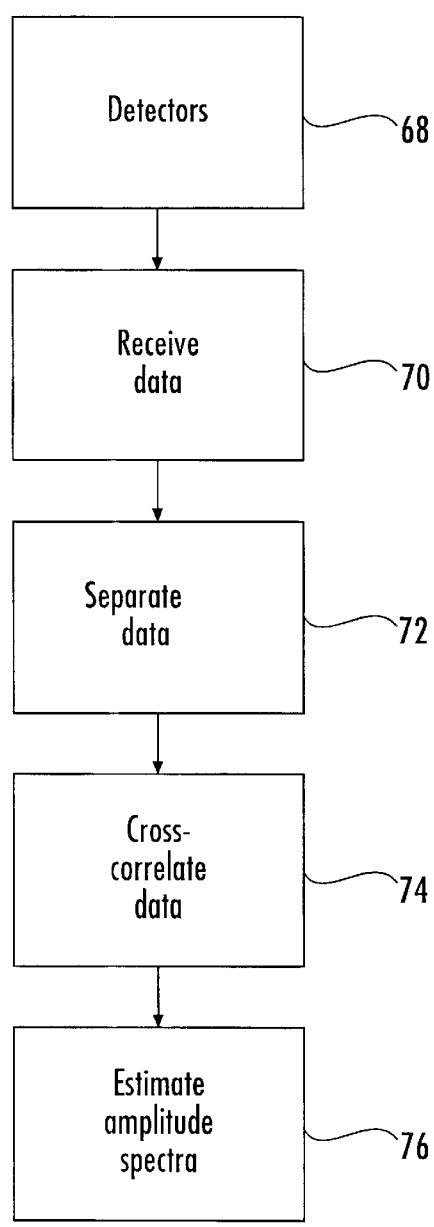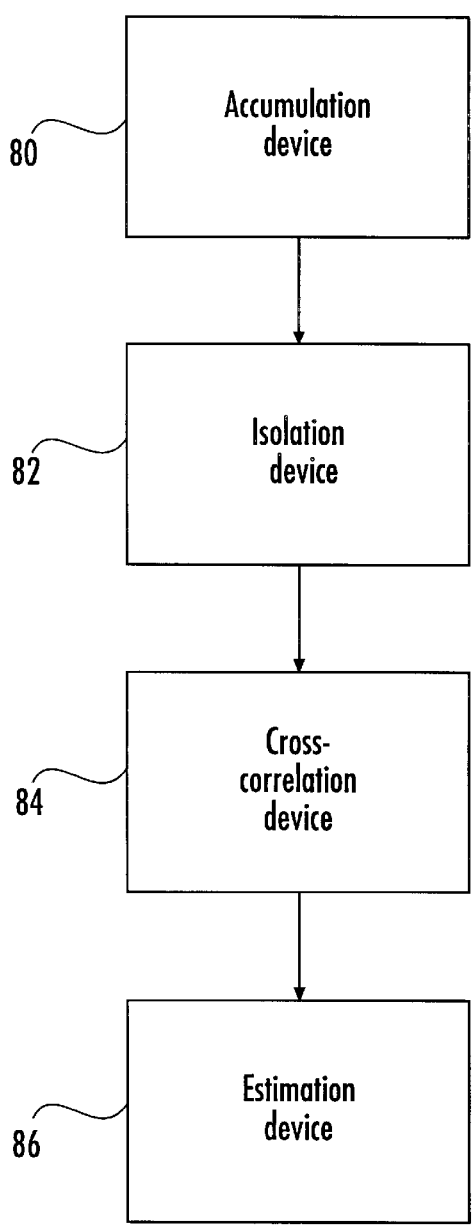

AMPLITUDE SPECTRA ESTIMATION

BACKGROUND OF THE INVENTION

1. Field of the Invention

The present invention pertains to seismic data waveform processing and more particularly to the estimation of amplitude spectra using up-going and down-going wavefields.

2. Related Prior Art

Much of seismic exploration today is being done offshore, that is, in the coastal waters io within several hundred miles of land. In some cases, offshore means slightly off the coast, such as wells off the coast of Louisiana or California. In other cases, offshore can be two hundred miles off the coast, such as the Outer Banks oil fields off the coast of Newfoundland. However, both cases have a common problem, seismic data acquisition is complicated by the presence of both upgoing and downgoing acoustic waves.

In situations where both upgoing and downgoing are present, pressure and particle velocity detectors may be used to separate upward traveling waves, (U), from downward traveling waves, (D). Pressure and particle velocity detectors on the water bottom can be used to separate upward traveling wavefields, (U), from polarity reversed downward traveling wavefields, (D), as demonstrated in U.S. Pat. No. 5,754,492 issued to Starr.

Many ways of determining the up going and down going vector wavefields may be used in separate upward traveling wavefields, from polarity reversed downward traveling wavefields. One method includes locating pairs of seismic receivers at the surface of a water column. This surface or reflecting interface may be the air water interface at the top surface or the water bottom when water column reverberations in marine seismic data is considered. This surface may also be the interface between geologic layers in subsurface formations. Further, in some cases, seismic data may be collected with pressure and particle velocity response receivers located at the same location while in other cases, seismic data may be collected with vertically spaced receivers. In the one case, up going and down going wavefields are directly detected by the two receivers in the one location. In the other case, up going and down going wavefields can be separated by comparing the sequential outputs of the receivers.

For the specific case where the pressure and particle velocity detectors are located on the water bottom, the impulse response of the earth recorded on the U data is the same as that which is recorded on the D data except for a linear phase shift associated with the two-way travel time through the water column, (Z). An autocorrelation is the time domain equivalent of the amplitude spectra in the frequency domain. In cases where a single measurement is made of a signal, such as single phone recordings, the amplitude spectra is estimated by autocorrelating the signal. Autocorrelation of a signal causes problems for a signal containing noise. The noise correlates with itself giving an error in the spectral estimation.

SUMMARY OF THE INVENTION

The present invention provides an improved method of amplitude spectra estimation using up-going and down-going wavefields. Pressure and particle velocity detectors are used to separate upward traveling wave, (U), from downward traveling waves, (D), in a seismic experiment. For the specific case where the pressure and particle velocity detectors are located on the water bottom, the impulse response of the earth recorded on the U data is the same as that which is recorded on the D data except for a linear phase shift associated with the two-way travel time through a water column, Z (see FIG. 1). An autocorrelation of seismic data is the time domain equivalent of the amplitude spectra in the frequency domain. In cases where a single measurement is made of a signal (single phone recordings), the amplitude spectra is estimated by autocorrelating the signal. This causes problems for a signal containing coherent noise or any noise other than random white noise. In an autocorrelation, coherent noise correlates with itself giving an error in the spectral estimation. The U and D signals are independent measurements of the same reflection sequence separated by a linear phase shift. Hence, the U and D signals can be crosscorrelated to improve the estimation of the amplitude spectra. This improvement comes from the fact that the noise contaminating the two signals are different and will not correlate as they would in an autocorrelation of the signal. For U, upgoing signals, and D, downgoing signals, that contain noise, an improved estimation of the amplitude spectra can be generated by using the amplitude component of the crosscorrelation of the upgoing and downgoing waves rather than that of the autocorrelation of the upgoing wave or the autocorrelation of the downgoing wave.

The present invention provides a method of amplitude spectra estimation for seismic data using up-going and down-going wavefields. The method of the present invention includes gathering up-going and down-going wavefields, separating the up-going and down-going wavefields from each other and crosscorrelating the separated wavefields. From the result of the crosscorrelation of the up-going and the down-going wavefields an estimate of the amplitude spectra of the seismic data can be obtained. In this method for amplitude spectra estimation, the gathering may include providing pressure and particle velocity detectors to distinguish between the up-going and the down-going wavefields. Also, in this method for amplitude spectra estimation, the gathering may include measuring the down-going waves and the separating may include removing the down-going waves from the seismic data. In the alternative, the gathering may include measuring the up-going waves and the separating may include removing the up-going waves from the seismic data.

BRIEF DESCRIPTION OF THE DRAWINGS

FIG. 16A is a graphical illustration of a seismic trace showing a synthetic up going trace with noise;

FIG. 16B is a graphical illustration of the amplitude spectrum of the trace of FIG. 16A;

FIG. 16C is a graphical representation of the phase spectrum of the trace of FIG. 16A.

FIG. 19A is a graphical illustration of a seismic trace showing autocorrelation of up going trace with noise with down going trace with noise;

FIG. 19B is a graphical illustration of the amplitude spectrum of the trace of FIG. 19A;

FIG. 19C is a graphical representation of the phase spectrum of the trace of FIG. 19A.

FIG. 20 is a flow chart of a method of amplitude spectra estimation using up-going and down-going wavefields.

FIG. 21 is a block diagram of a system for effecting the method of FIG. 20.

DESCRIPTION OF THE PREFERRED EMBODIMENT

Pressure and particle velocity detectors on the water bottom can be used to separate upward traveling wavefields, (U), from polarity reversed downward traveling wavefields, (D). For the specific case where the pressure and particle velocity detectors are located on the water bottom, the impulse response of the earth recorded on the U data is the same as that which is recorded on the D data except for a linear phase shift associated with the two-way travel time through the water column, (Z). An autocorrelation is the time domain equivalent of the amplitude spectra in the frequency domain. In cases where a single measurement is made of a signal (single phone recordings), the amplitude spectra is estimated by autocorrelating the signal. This causes problems for a signal containing noise. The noise correlates with itself giving an error in the spectral estimation. The U and D signals are independent measurements of the same reflection sequence separated by a linear phase shift. Hence, the U and D signals can be crosscorrelated to improve the estimation of the amplitude spectra. This improvement comes from the fact that the noise contaminating the two signals are different and will not correlate as they would in an autocorrelation. For U and D signals containing noise, an improved estimation of the amplitude spectra can be generated by using the amplitude component of the crosscorrelation rather than that of the autocorrelations.

Figure 1:
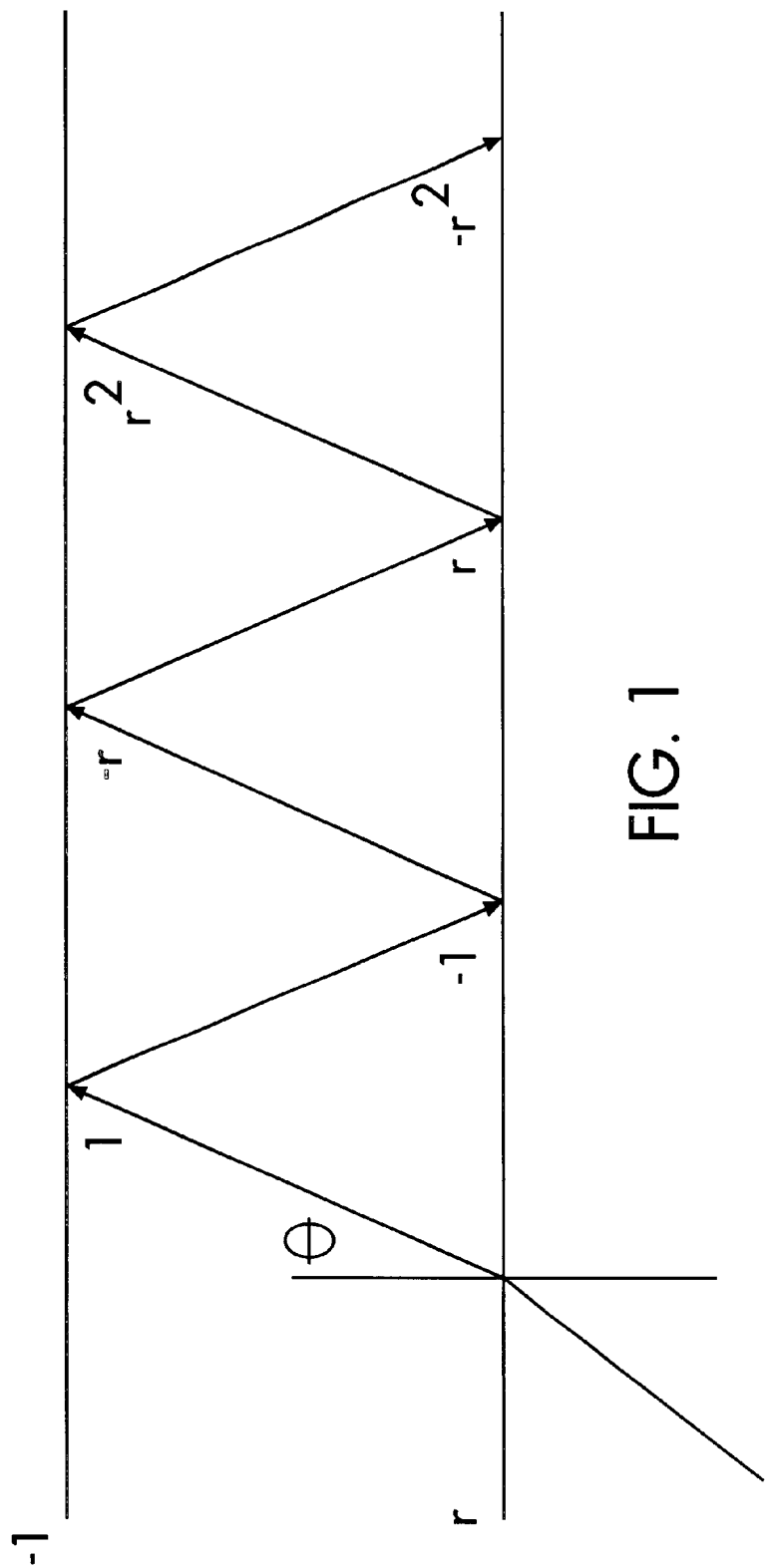
FIG. 1 is a drawing illustrating trapped reflection energy from the subsurface trapped in a water column between the water surface and the water bottom.

FIG. 1 illustrates a plane wave and its reverberations trapped in the water column. Reflection energy travels up through the subsurface and is recorded by the detectors lying on the water bottom. The reflection energy then becomes trapped in the water column where it is reflected back and forth between the water's surface (with a reflection coefficient of −1) and the water bottom (with a reflection coefficient of r).

The pressure and velocity responses to the water reverberations, in the form of a Z-transform, are:

$$P(Z)=Z^0-(1+r)Z^1+r(1+r)Z^2-r^2(1+r)Z^3+\ldots$$

$$\frac{\alpha}{\cos\Theta}V(Z) = Z^0 - (1+r)Z^1 + r(1+r)Z^2 - r^2(1+r)Z^3 + \ldots$$

where:

P=pressure
V=partial velocity
Z=$e^{i\omega\tau}$
α=impedance
Θ=angle of incidence
r=reflection coefficient of the water bottom
τ=two-way travel time through the water column $$= \frac{2d}{v\cos\Theta}$$

where d=vertical water depth
v=acoustic velocity

Calculating the infinite geometric progression of the reverberation operator yields:

$$P(Z) = 1 + \frac{(1-r)Z}{1+rZ} \quad (3)$$

$$= \frac{1-Z}{1+rZ}$$

$$\frac{\alpha}{\cos\Theta}V(Z) = 1 - \frac{(1-r)Z}{1+rZ} \quad (4)$$

$$= \frac{1+Z}{1+rZ}$$

Adding equations (3) and (4) yields the up going wave field U(Z) and subtracting (3) from (4) yields the polarity reversed down going wavefield D(Z).

$$U(Z) = \frac{1}{2}\frac{\alpha}{\cos\Theta}V(Z) + P(Z)$$

$$= \frac{1}{2}\frac{1+Z}{1+rZ} + \frac{1-Z}{1+rZ}$$

$$= \frac{1}{1+rZ}$$

$$D(Z) = \frac{1}{2}\frac{\alpha}{\cos\Theta}V(Z) - P(Z)$$

$$= \frac{1}{2}\frac{1+Z}{1+rZ} - \frac{1-Z}{1+rZ}$$

$$= \frac{Z}{1+rZ}$$

For the one dimensional case, the difference between U(Z) and D(Z) is the two way travel time through the water column Z. Substituting $e^{i\omega\tau}$ for Z the amplitude and phase components for U(Z) and D(Z) in the frequency domain, u(ω) and d(ω), respectively.

$$u(\omega) = \frac{1}{1+re^{i\omega\tau}}$$

$$/u(\omega)/ = /[r^2 + 2r\cos(\omega\tau) + 1]^{\frac{1}{2}}$$

$$\phi(\omega) = \tan^{-1}\left(\frac{r\sin(\omega\tau)}{1+r\cos(\omega\tau)}\right)$$

$$d(\omega) = \frac{e^{i\omega\tau}}{1+re^{i\omega\tau}}$$

$$/d(\omega)/ = /[r^2 + 2r\cos(\omega\tau) + 1]^{\frac{1}{2}}$$

$$\phi(\omega) = \tan^{-1}\left(\frac{\sin(\omega\tau)}{r+\cos(\omega\tau)}\right)$$

Equations (7) and (8) show that the amplitude spectra /u(ω)/ and /d(ω)/ are identical. Hence, in a noise free environment, the amplitude component autocorrelation of U(Z) is identical to that of the crosscorrelation of U(Z) and D(Z). The crosscorrelation of U(Z) and D(Z) will yield improved amplitude spectrum estimation over autocorrelation where U(Z) and D(Z) are contaminated by random noise.

Figures 2A, 2B, 2C:
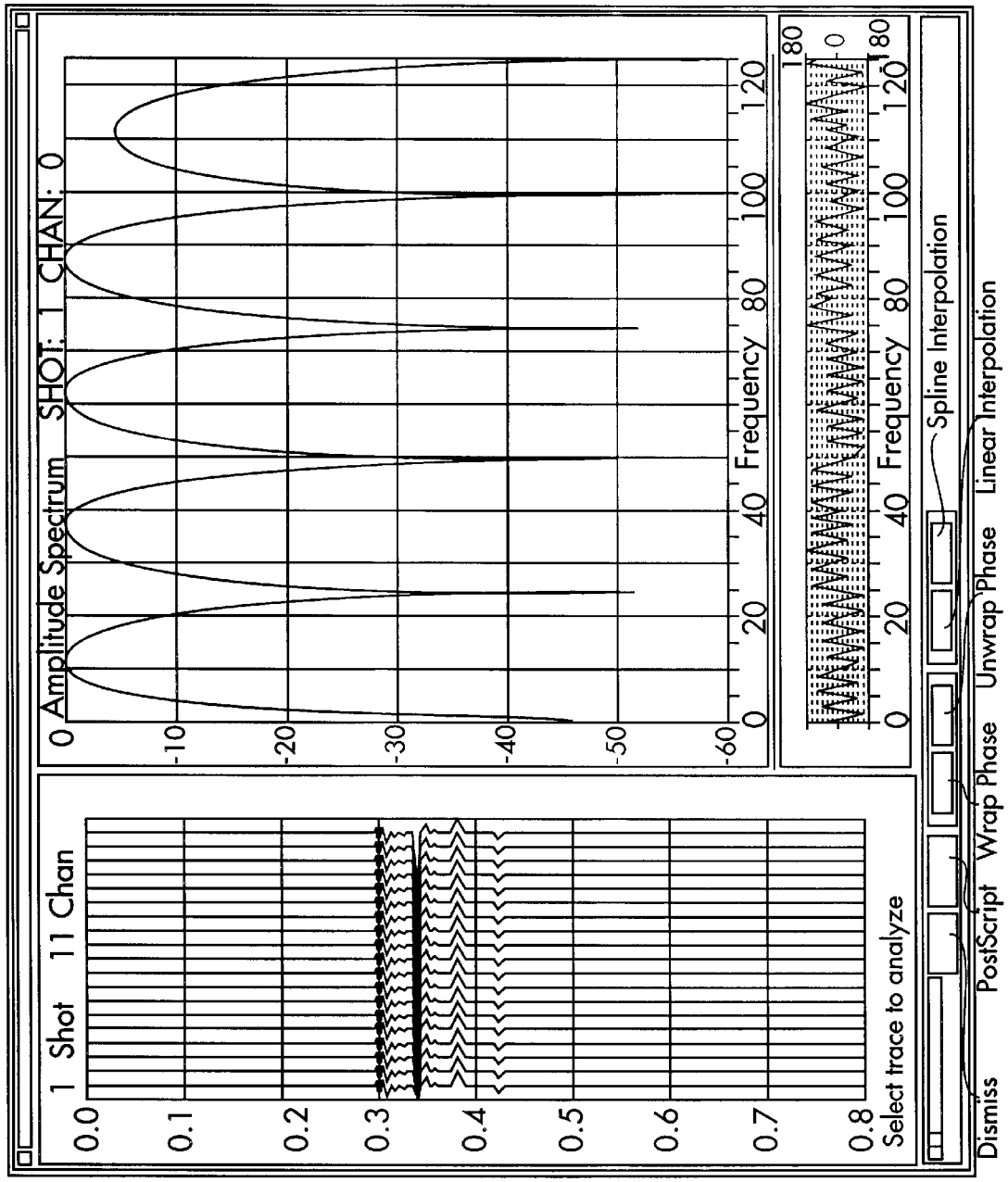
FIG. 2A is a graphical illustration of a seismic trace showing pressure impulse response.
FIG. 2B is a graphical illustration of the amplitude spectrum of the trace of FIG. 2A.
FIG. 2C is a graphical representation of the phase spectrum of the trace of FIG. 2A.
Figures 3A, 3B, 3C:
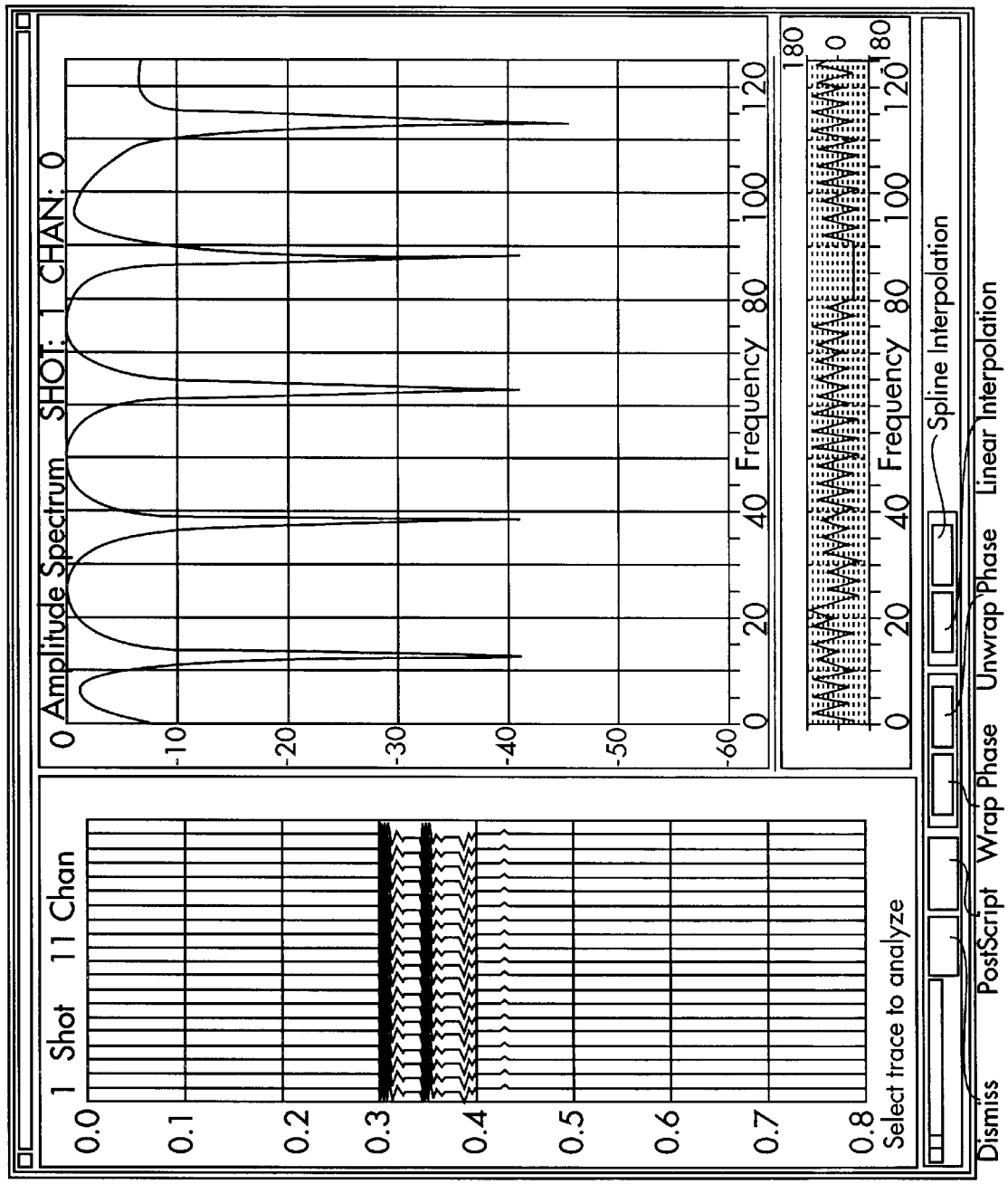
FIG. 3A is a graphical illustration of a seismic trace showing velocity impulse response.
FIG. 3B is a graphical illustration of the amplitude spectrum of the trace of FIG. 3A.
FIG. 3C is a graphical representation of the phase spectrum of the trace of FIG. 3A.

FIG. 2A and 3A are the pressure and particle velocity impulse response for a hydrophone and geophone placed on a water bottom with a reflection coefficient of 0.3, water depth of 30 meters and a water velocity of 1500 meters/second. FIGS. 2B and 3B are graphs of the amplitude spectra of the traces depicted in FIGS. 2A and 3A, respectively. FIGS. 2C and 3C are graphs of the frequency spectra that coincide with the amplitude spectra of FIGS. 2B and 3B.

Figures 4A, 4B, 4C:
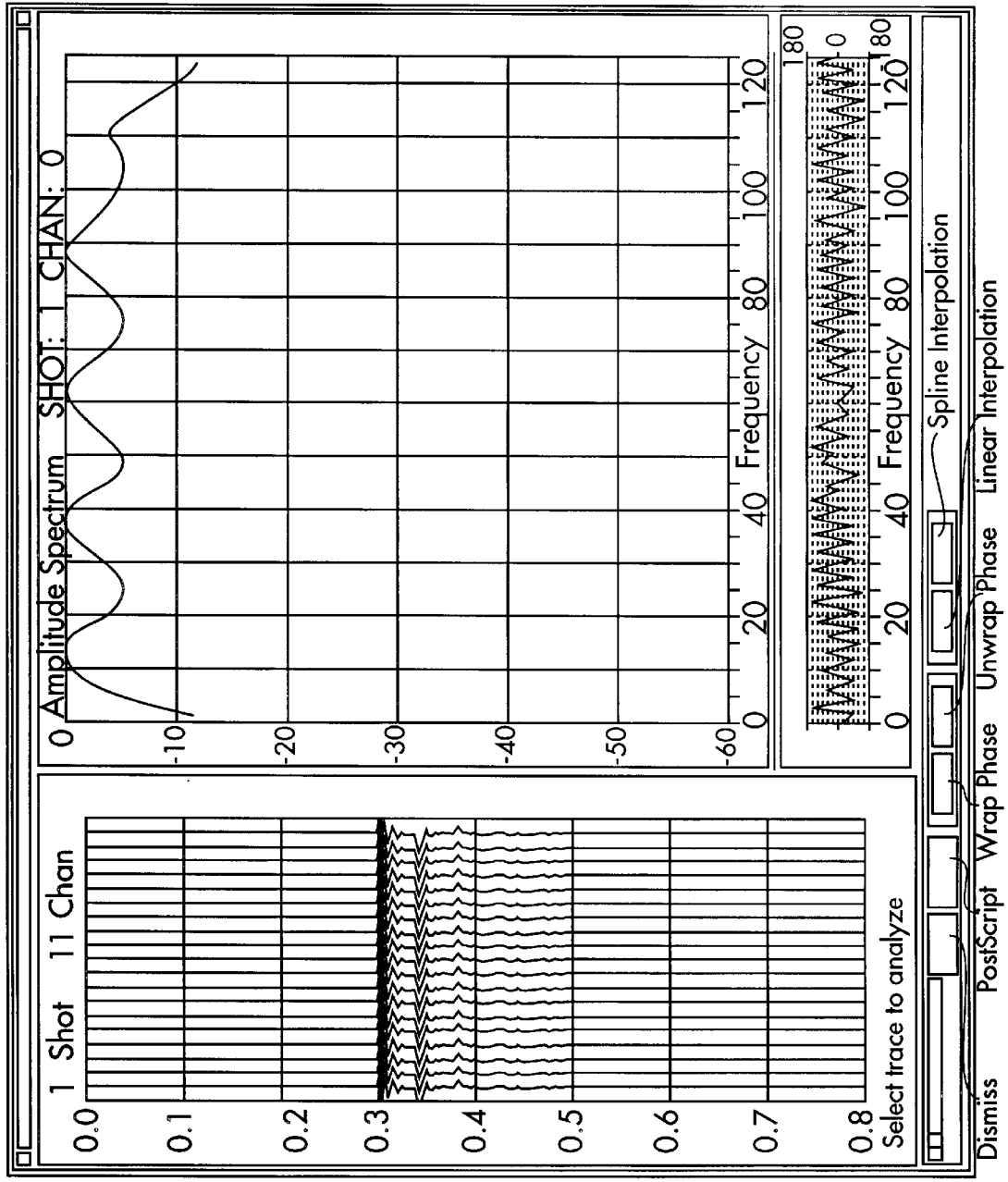
FIG. 4A is a graphical illustration of a seismic trace showing up going impulse response.
FIG. 4B is a graphical illustration of the amplitude spectrum of the trace of FIG. 4A.
FIG. 4C is a graphical representation of the phase spectrum of the trace of FIG. 4A.

Adding the pressure impulse response to the velocity impulse response yields the up-going impulse response shown in FIG. 4A. Similarly, as associated with FIGS. 2A and 3A, FIG. 4B is a graph of the amplitude spectrum and FIG. 4C is the frequency spectrum of the trace of FIG. 4A.

Figures 5A, 5B, 5C:
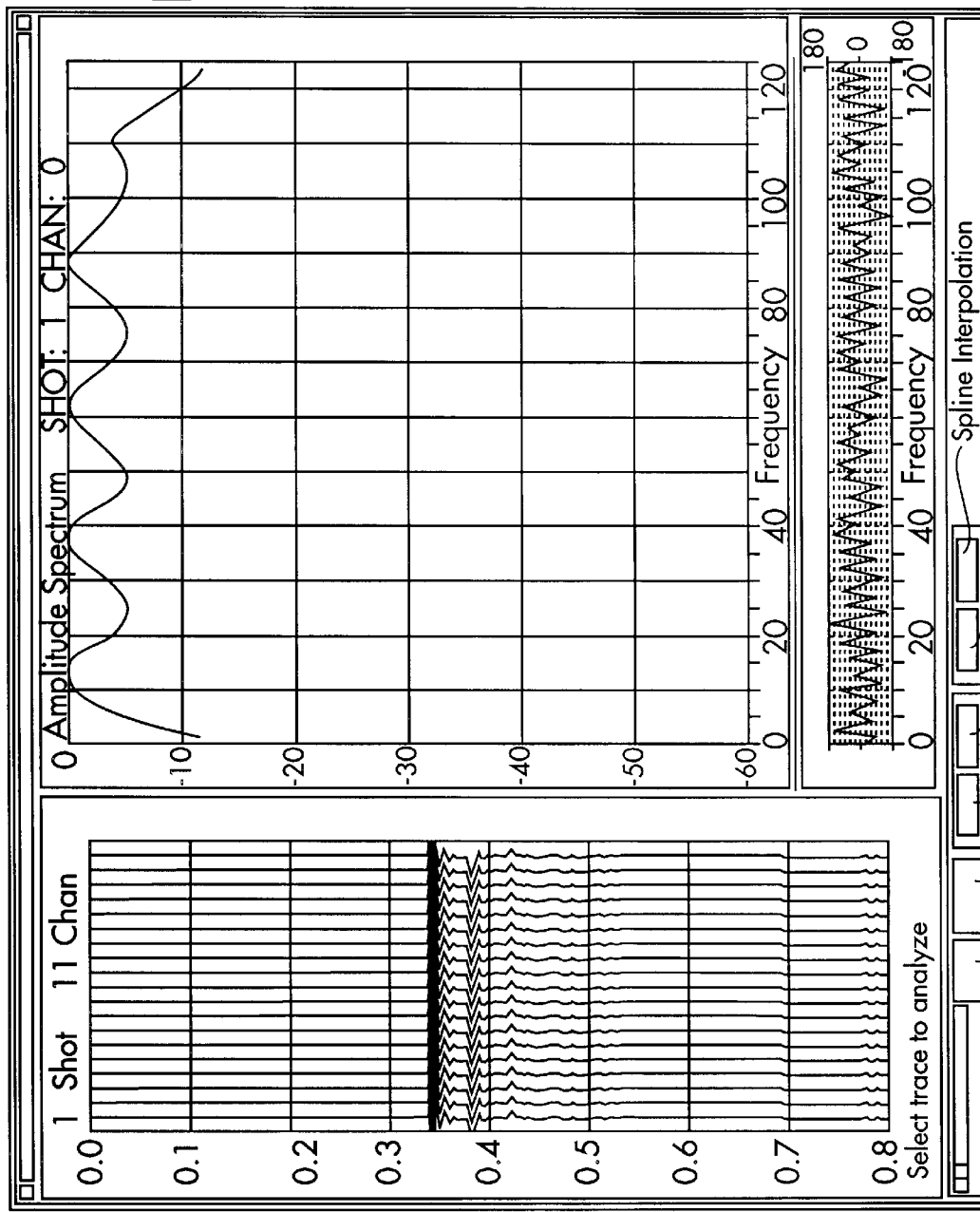
FIG. 5A is a graphical illustration of a seismic trace showing down going impulse response.
FIG. 5B is a graphical illustration of the amplitude spectrum of the trace of FIG. 5A.
FIG. 5C is a graphical representation of the phase spectrum of the trace of FIG. 5A.

Subtracting the pressure impulse response from the velocity impulse response yields the polarity reversed down-going impulse response illustrated in FIG. 5A along with its associated amplitude spectrum in FIG. 5B and frequency spectrum in FIG. 5C. The amplitude spectra illustrated in FIGS. 4B and 5B are graphical representations identical to the relationships described by equations 7 and 8.

Figures 6A, 6B, 6C:
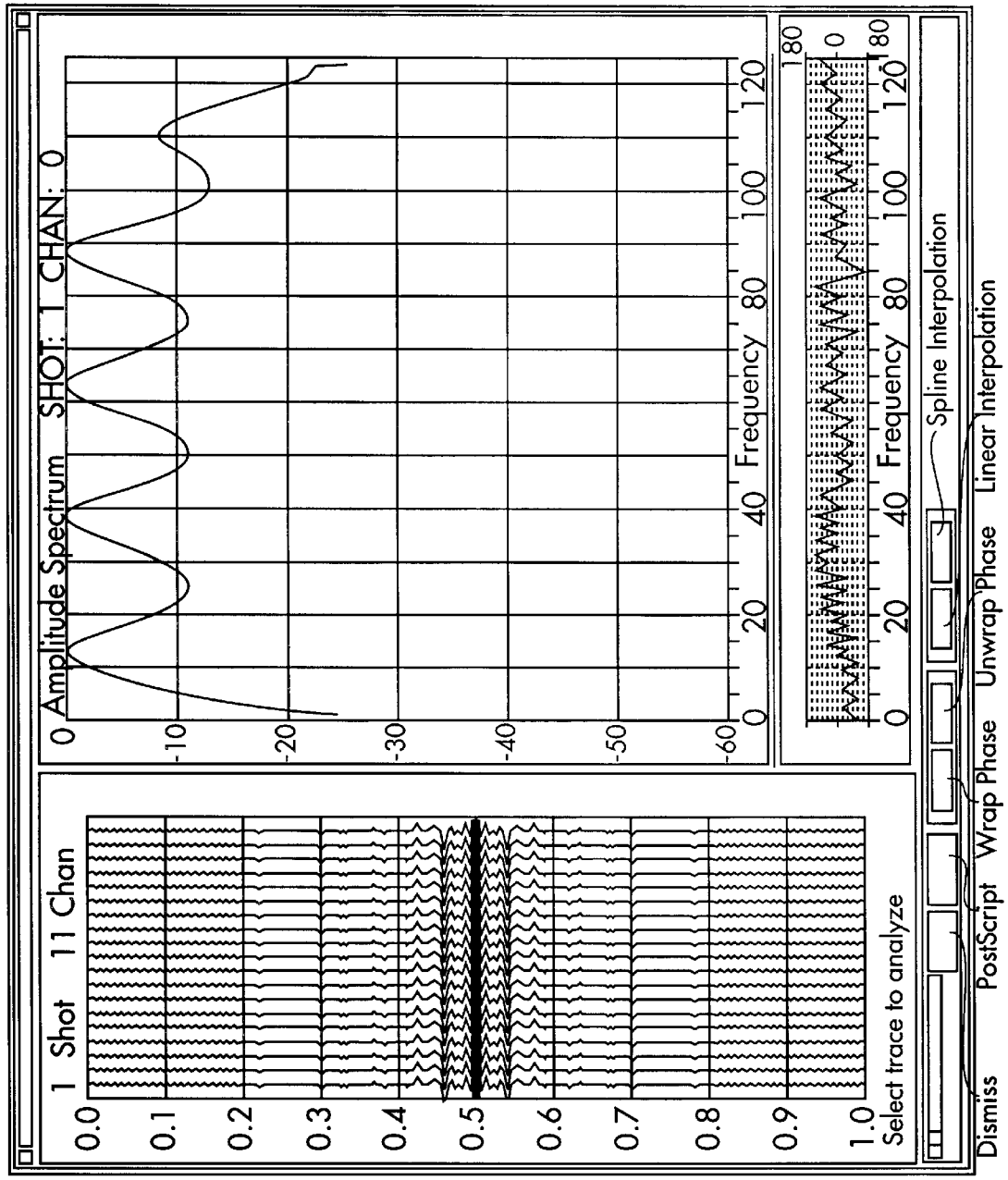
FIG. 6A is a graphical illustration of a seismic trace showing autocorrelation of up going impulse response.
FIG. 6B is a graphical illustration of the amplitude spectrum of the trace of FIG. 6A.
FIG. 6C is a graphical representation of the phase spectrum of the trace of FIG. 6A.

FIG. 6A is a seismic trace of the autocorrelation of the up-going impulse response. FIG. 6B is the amplitude spectrum of the trace illustrated in FIG. 6A and FIG. 6C is its frequency spectrum.

Figures 7A, 7B, 7C:
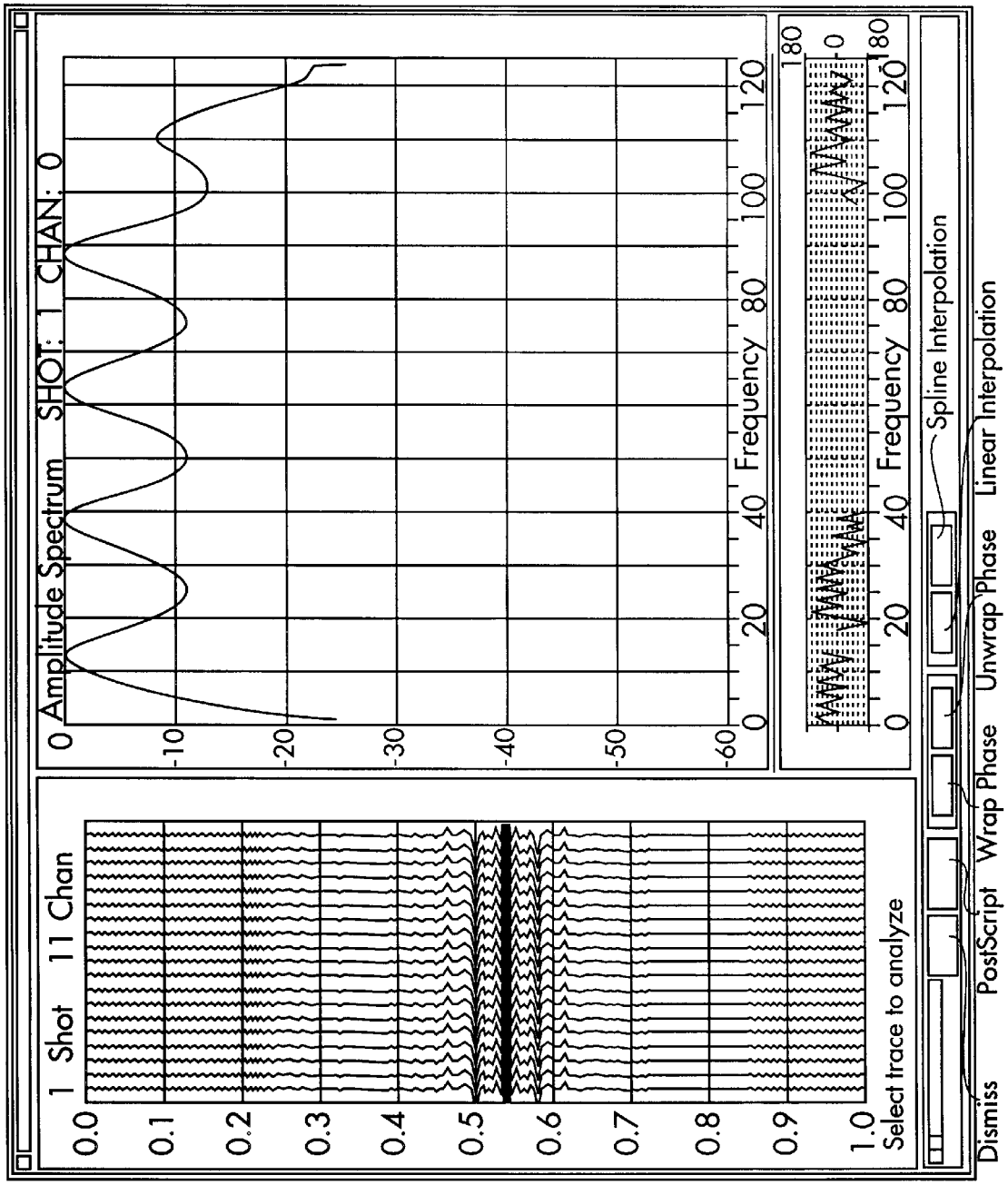
FIG. 7A is a graphical illustration of a seismic trace showing autocorrelation of up going and down going impulse responses.
FIG. 7B is a graphical illustration of the amplitude spectrum of the trace of FIG. 7A.
FIG. 7C is a graphical representation of the phase spectrum of the trace of FIG. 7A.
Figures 8A, 8B, 8C:
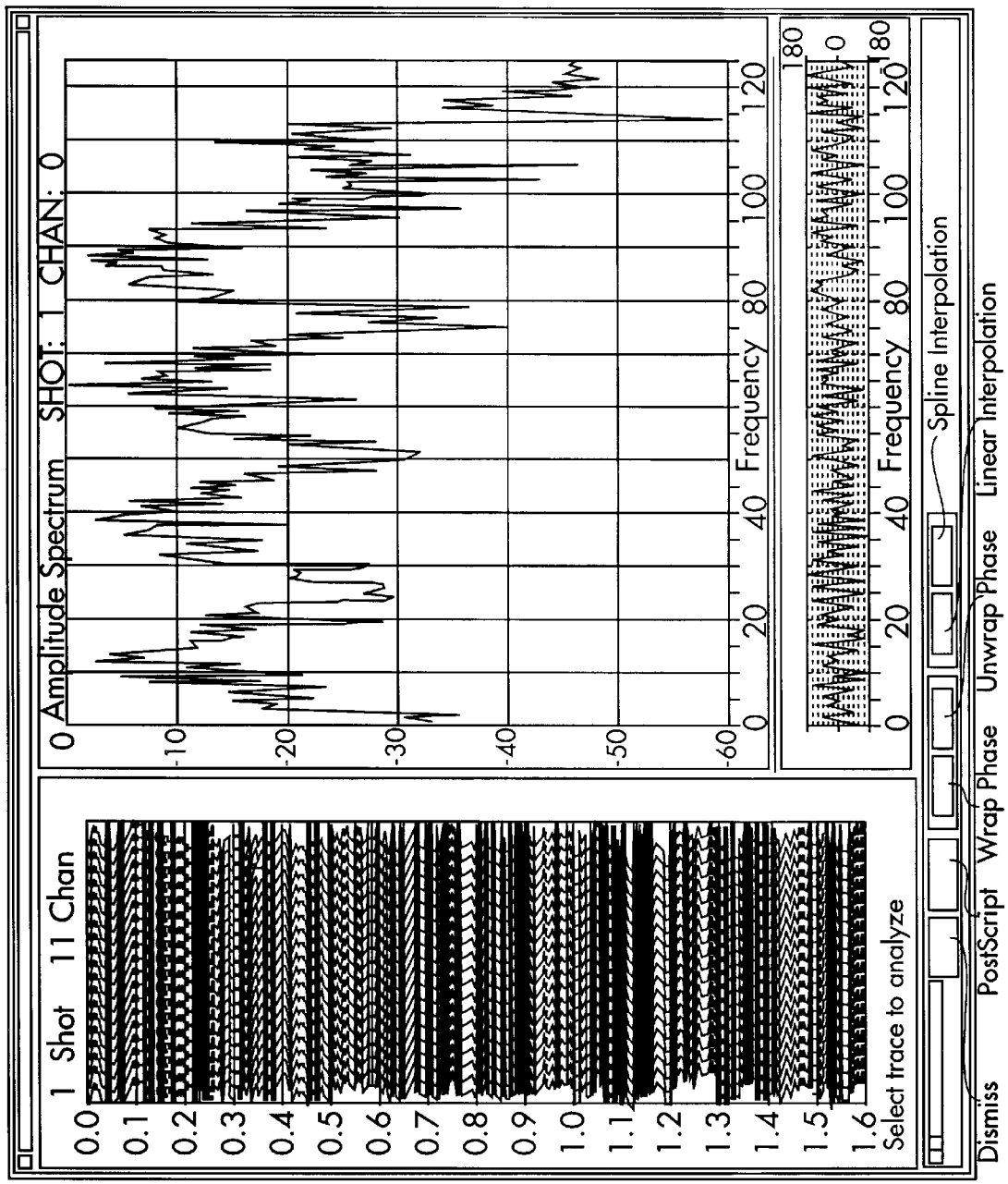
FIG. 8A is a graphical illustration of a seismic trace showing a synthetic pressure trace.
FIG. 8B is a graphical illustration of the amplitude spectrum of the trace of FIG. 8A.
FIG. 8C is a graphical representation of the phase spectrum of the trace of FIG. 8A.
Figures 9A, 9B, 9C:
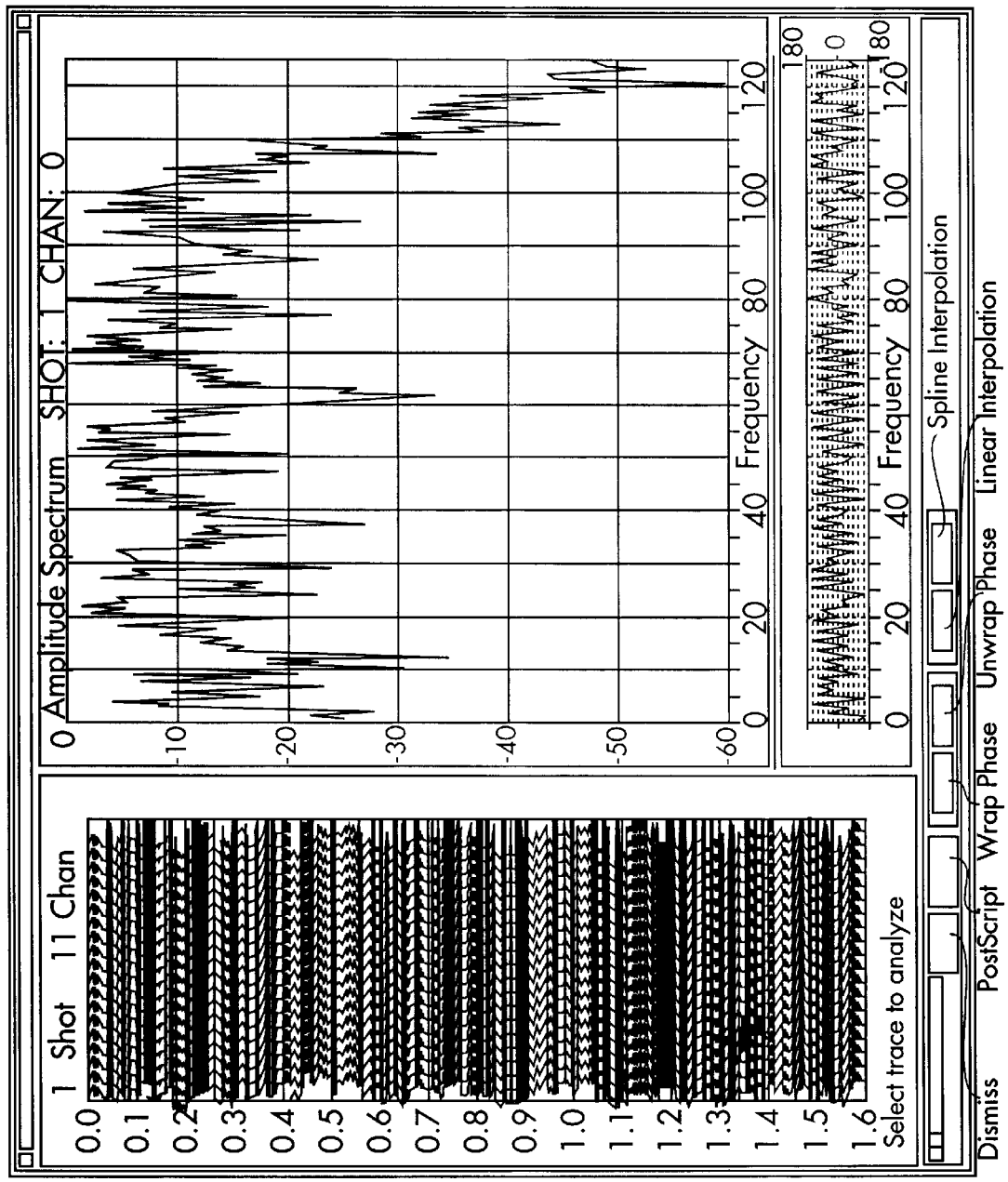
FIG. 9A is a graphical illustration of a seismic trace showing a synthetic velocity trace.
FIG. 9B is a graphical illustration of the amplitude spectrum of the trace of FIG. 9A.
FIG. 9C is a graphical representation of the phase spectrum of the trace of FIG. 9A.
Figures 10A, 10B, 10C:
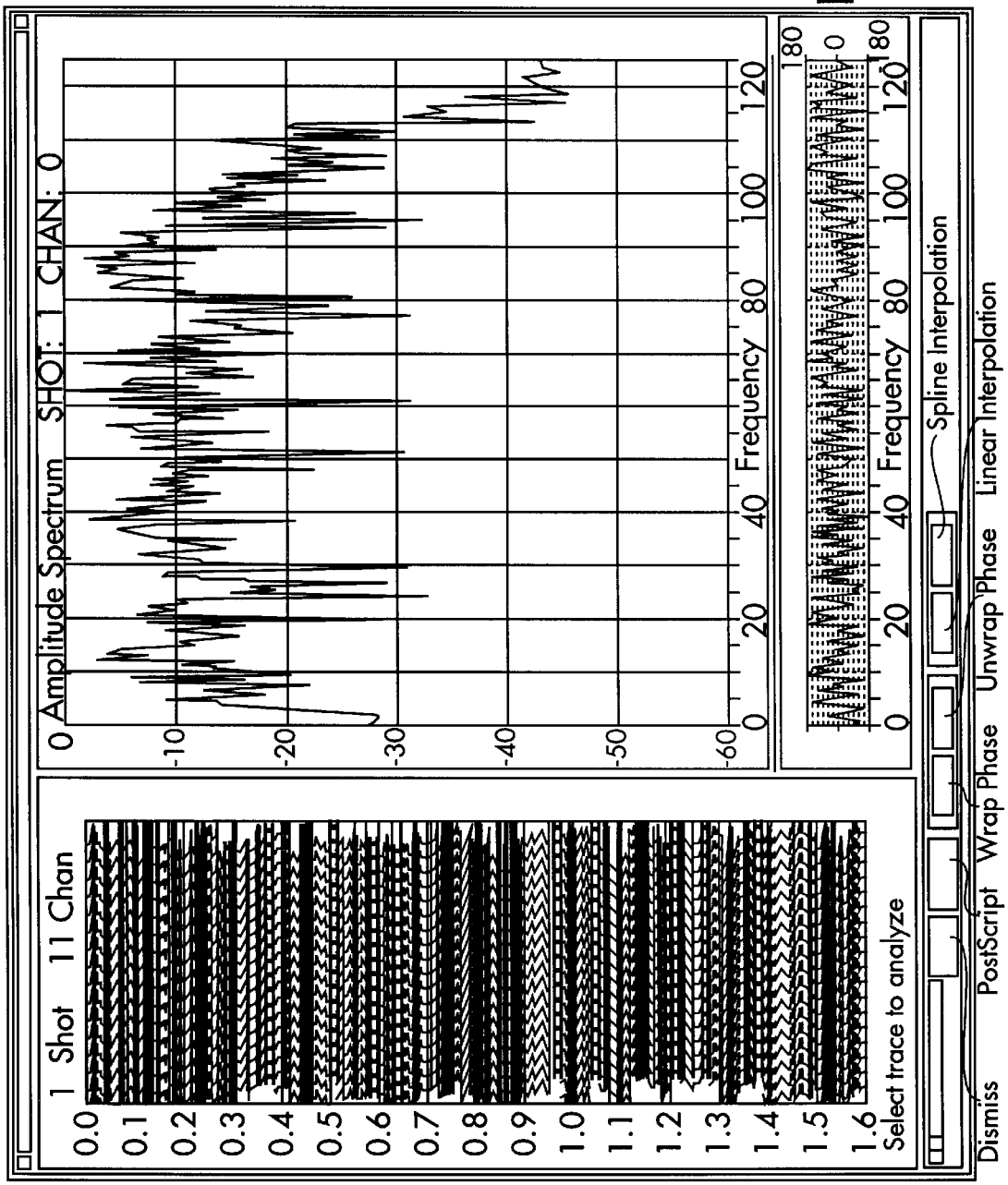
FIG. 10A is a graphical illustration of a seismic trace showing a synthetic up going trace.
FIG. 10B is a graphical illustration of the amplitude spectrum of the trace of FIG. 10A.
FIG. 10C is a graphical representation of the phase spectrum of the trace of FIG. 10A.
Figures 11A, 11B, 11C:
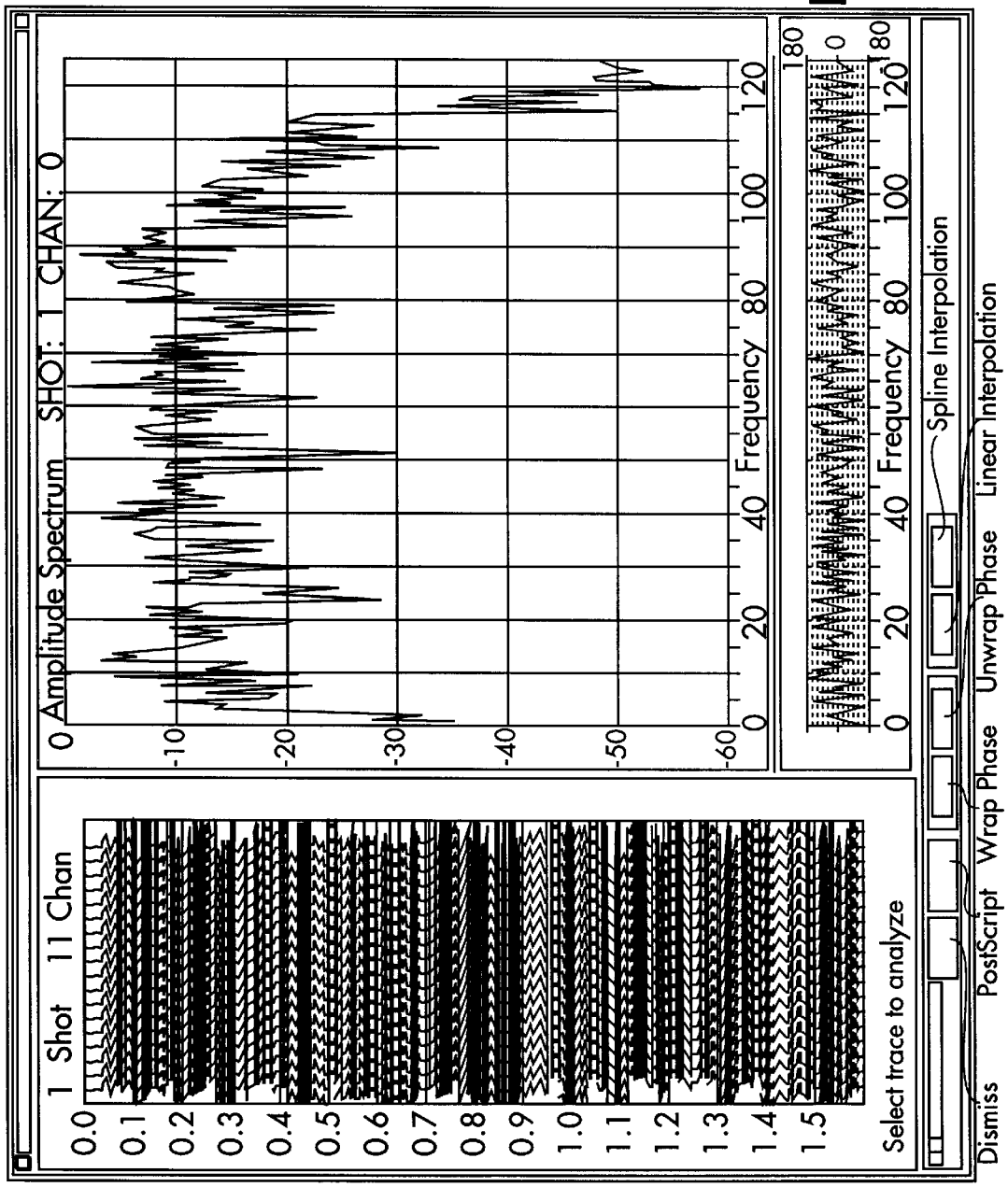
FIG. 11A is a graphical illustration of a seismic trace showing a synthetic down going trace.
FIG. 11B is a graphical illustration of the amplitude spectrum of the trace of FIG. 11A.
FIG. 11C is a graphical representation of the phase spectrum of the trace of FIG. 11A.
Figures 12A, 12B, 12C:
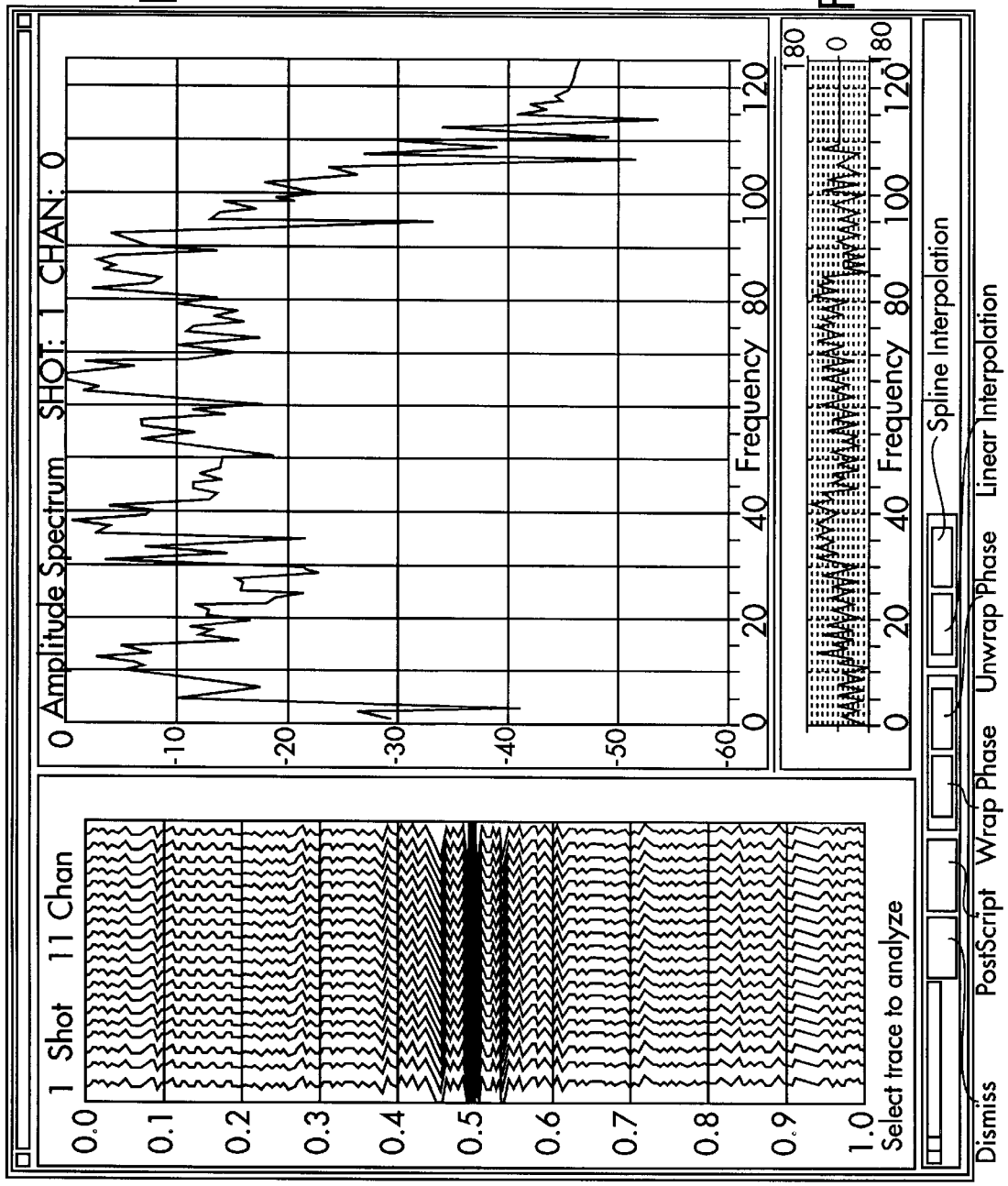
FIG. 12A is a graphical illustration of a seismic trace showing autocorrelation of up going trace.
FIG. 12B is a graphical illustration of the amplitude spectrum of the trace of FIG. 12A.
FIG. 12C is a graphical representation of the phase spectrum of the trace of FIG. 12A.
Figures 13A, 13B, 13C:
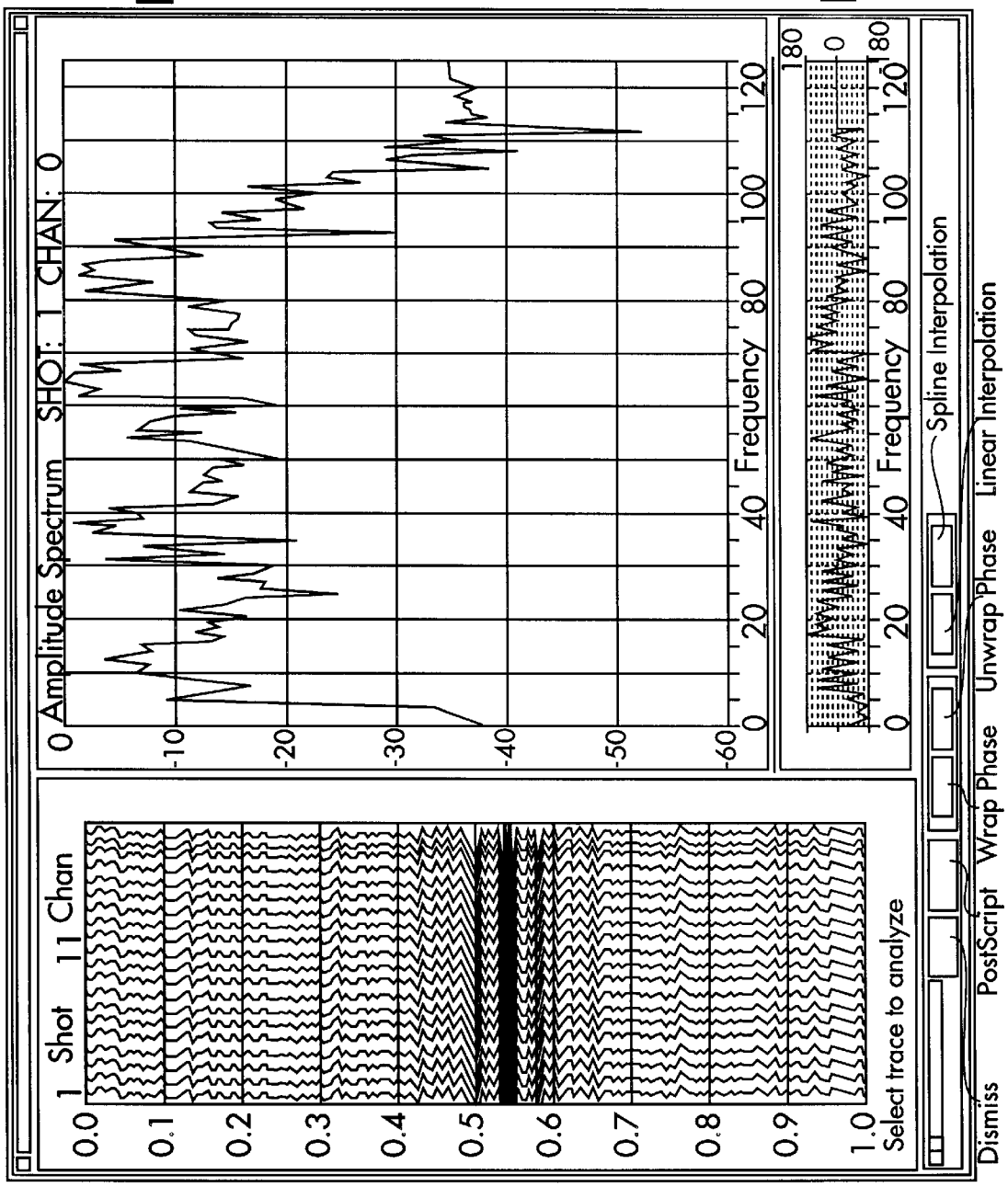
FIG. 13A is a graphical illustration of a seismic trace showing crosscorrelation of up going trace with down going trace.
FIG. 13B is a graphical illustration of the amplitude spectrum of the trace of FIG. 13A.
FIG. 13C is a graphical representation of the phase spectrum of the trace of FIG. 13A.
Figures 14A, 14B, 14C:
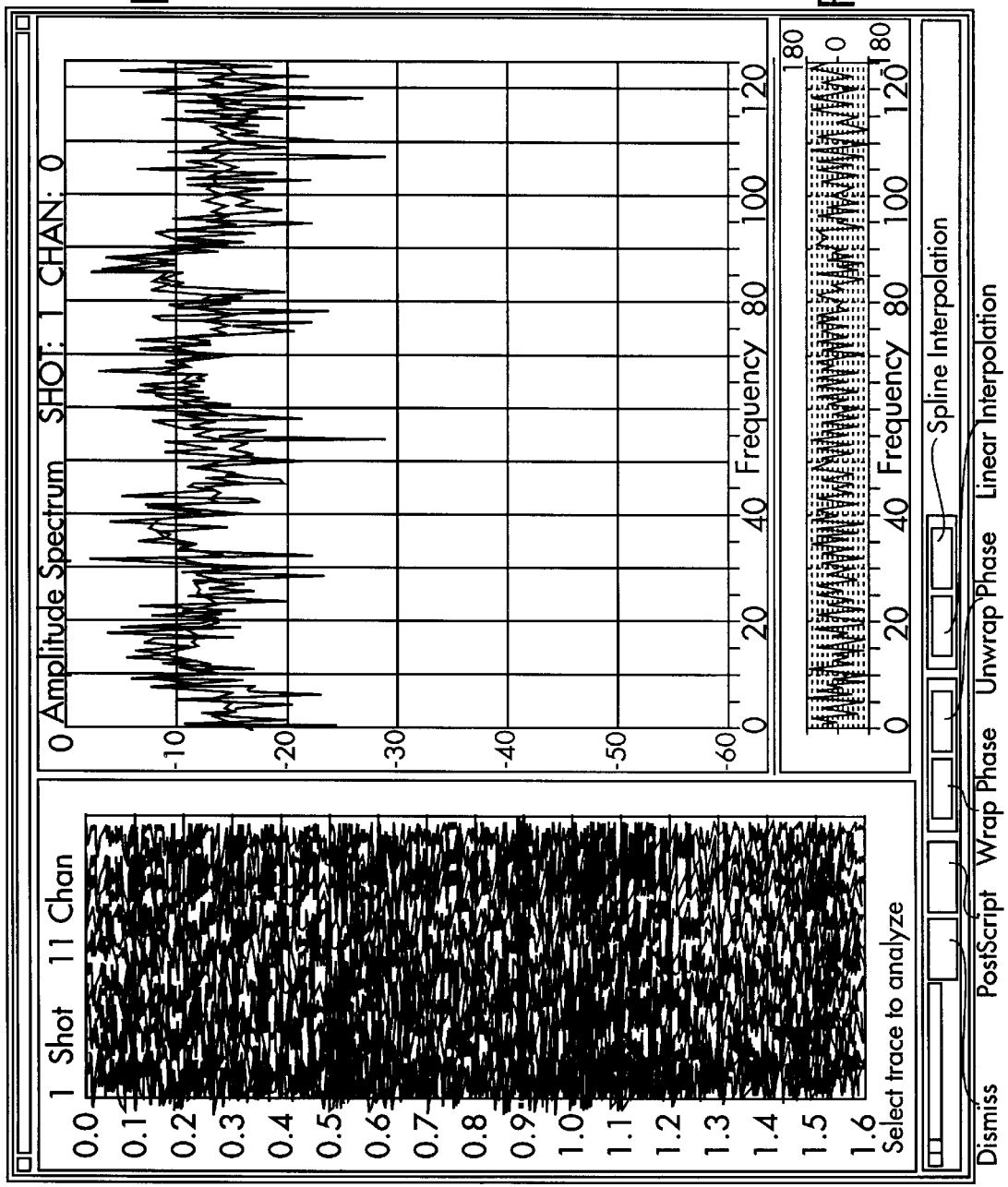
FIG. 14A is a graphical illustration of a seismic trace showing a synthetic pressure trace with noise.
FIG. 14B is a graphical illustration of the amplitude spectrum of the trace of FIG. 14A.
FIG. 14C is a graphical representation of the phase spectrum of the trace of FIG. 14A.
Figures 15A, 15B, 15C:
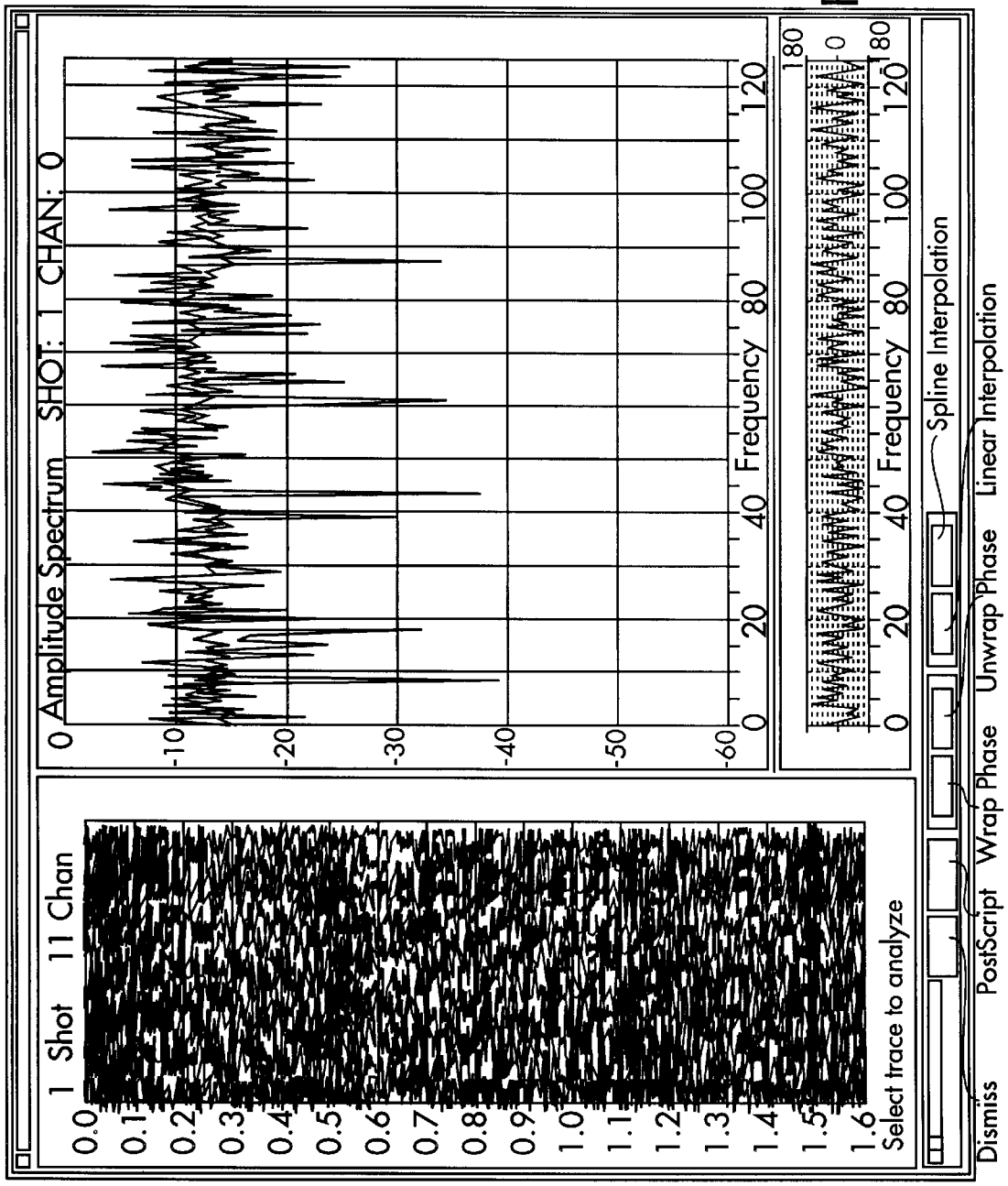
FIG. 15A is a graphical illustration of a seismic trace showing a synthetic velocity trace with noise.
FIG. 15B is a graphical illustration of the amplitude spectrum of the trace of FIG. 15A.
FIG. 15C is a graphical representation of the phase spectrum of the trace of FIG. 15A.
Figures 17A, 17B, 17C:
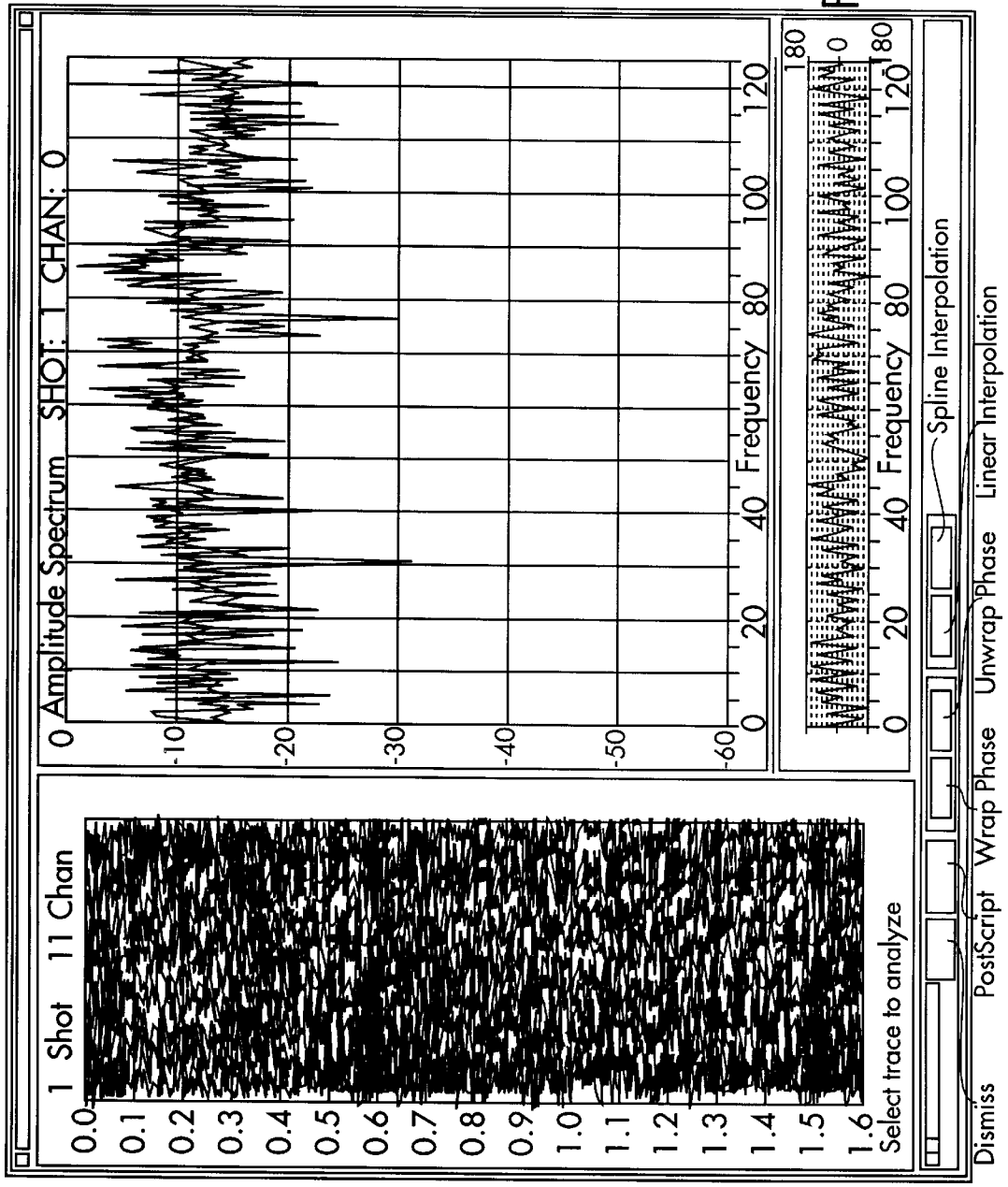
FIG. 17A is a graphical illustration of a seismic trace showing a synthetic down going trace with noise.
FIG. 17B is a graphical illustration of the amplitude spectrum of the trace of FIG. 17A.
FIG. 17C is a graphical representation of the phase spectrum of the trace of FIG. 17A.
Figures 18A, 18B, 18C:
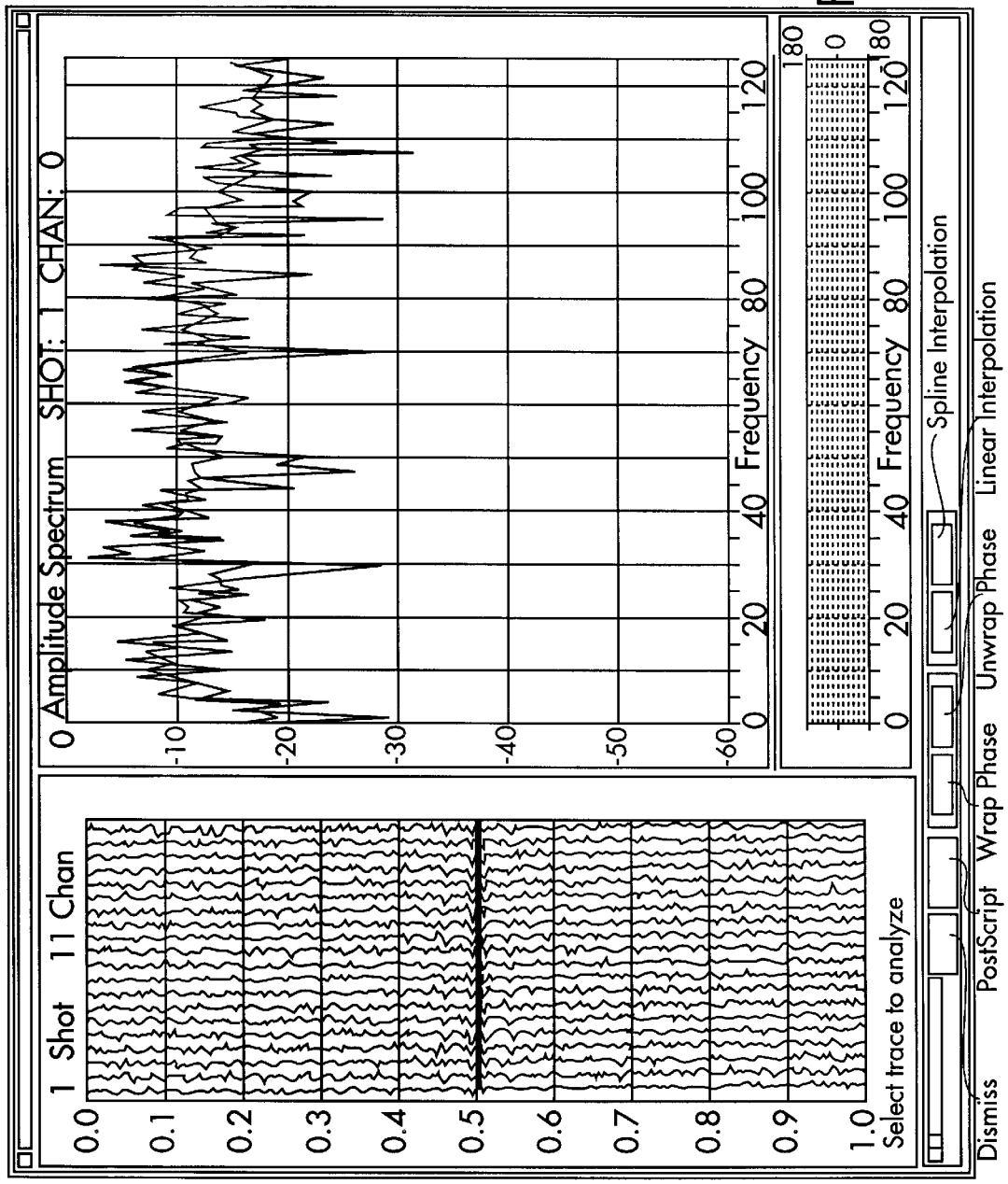
FIG. 18A is a graphical illustration of a seismic trace showing autocorrelation of up going trace with noise.
FIG. 18B is a graphical illustration of the amplitude spectrum of the trace of FIG. 18A.
FIG. 18C is a graphical representation of the phase spectrum of the trace of FIG. 18A.

FIG. 7A is the crosscorrelation of the up-going and down-going impulse responses and their associated amplitude spectrum in FIG. 7B. FIG. 7C is the frequency spectrum of the trace of FIG. 7A. FIGS. 6A and 7A have identical amplitude spectra as illustrated in FIGS. 6B and 7B.

This exercise was repeated in FIGS. 8A through 13A. In this case a random number sequence was convolved with the pressure and particle velocity impulse responses. The random number sequence simulates a typical reflection sequence of the Earth. There is some difference between the spectra of the autocorrelation and crosscorrelation in FIGS. 12A and 13A. This is primarily due to energy which continues to resonate far away from lag 0 (0.5 seconds) and the time shift between the autocorrelation and crosscorrelation. This could be corrected by applying a linear phase shift to align the up-going and down-going trace data prior to correlation. These differences are considered minor and of no consequence.

FIGS. 14A through 19A are the same as FIGS. 8A through 13A with the addition of random noise to the pressure and velocity data. The noise is at the same amplitude level as that of the modeled signal. That is when the signal to noise ratio equals 1. The resolution of the notches in the autocorrelation has been reduced from 15 dB in the noise free case (see FIG. 12A) to approximately 6 dB for the data with random noise (see FIG. 18A). The crosscorrelation of up going and down going data with noise (see FIG. 19A) shows a 10 dB resolution of the notches in the amplitude spectra. This is a significant improvement of approximately 4 dB over the autocorrelation.

Referring now to FIG. 20, a flow chart illustrating a method of amplitude spectra estimation for seismic data using up-going and down-going wavefields. Initially, seismic data gathered by detectors 68 having up-going and down-going wavefields is received at block 70. Detectors 68 may include pressure and particle velocity detectors to distinguish between up-going and down-going wavefields in the seismic data. At block 72 the seismic data is separated into up-going and down-going wavefields. At block 74 the separated up-going wavefields are crosscorrelated with the separated down-going wavefields. At block 76 the amplitude spectra of the seismic data is estimated from the crosscorrelation of the separated up-going wavefield and the separated down-going wavefield and displayed.

Referring now to FIG. 21 an apparatus or system for amplitude spectra estimation of seismic data is illustrated. This system may be accomplished by a configurable solid state device such as digital computer or the like in conjunction with detectors and seismic acoustic pulse generators commonly in use in the art. The system includes an accumulation means at block 80 for gathering seismic data having up-going and down-going wavefields. In this embodiment accumulation means includes a means for receiving prerecorded seismic data, although accumulation means may also include detectors for receiving seismic pulses and recording the received pulses as electrical signals.

At block 82 an isolating means for separating the up-going wavefields and the down-going wavefields from each other is provided. This may be done by a digital computer that distinguishes upgoing wavefields and down-going wavefields by their shift difference or by other means.

Block 84 provides a means for crosscorrelating the up-going wavefields with the down-going wavefields, which again, may be a programmed portion of a digital computer.

A determining means for estimating an amplitude spectra of the seismic data from the result of the crosscorrelation of the up-going wavefields and the down-going wavefields is provided at block 86. In this embodiment, the determining means may be a configurable portion of a digital computer along with a cathode ray tube display or a seismograph or liquid crystal display, etc.

As described, for seismic exploration where up going and down going energy can be separated, the amplitude component of the crosscorrelation of the up going signal with the down going signal will produce an improved amplitude spectra estimation over that of the autocorrelation of the upgoing signal and the autocorrelation of the downgoing signal in the presence of random noise.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method of amplitude spectra estimation for seismic data comprising:
   gathering seismic data having up-going and down-going wavefields;
   separating said up-going and said down-going wavefields from each other;
   crosscorrelating said up-going and said down-going wavefields; and
   estimating an amplitude spectra of the seismic data from the result of said crosscorrelation of said up-going and said down-going wavefields.

2. The method according to claim 1 wherein said gathering includes providing pressure and particle velocity detectors in said gathering to distinguish between said up-going and said down-going wavefields in the seismic data.

3. The method according to claim 1 wherein said gathering includes measuring said down-going waves.

4. The method according to claim 3 wherein said separating includes removing said down-going waves from the seismic data.

5. The method according to claim 1 wherein said gathering includes measuring said up-going waves.

6. The method according to claim 5 wherein said separating includes removing said up-going waves from the seismic data.

7. A method of amplitude spectra estimation for seismic data using up-going and down-going wavefields comprising:
   receiving seismic data having up-going and down-going wavefields;
   separating said seismic data into said up-going and said down-going wavefields;
   crosscorrelating said separated up-going with down-going wavefields; and
   estimating an amplitude spectra of the seismic data from said crosscorrelation of said separated up-going and down-going wavefields.

8. The method according to claim 7 wherein said separating includes identifying said up-going waves and separating said identified up-going waves from said seismic data.

9. The method according to claim 7 wherein said separating includes identifying said down-going waves and separating said identified down-going waves from said seismic data.

10. A method of amplitude spectra estimation for seismic data comprising:
    gathering seismic data having up-going and down-going wavefields by providing pressure and particle velocity detectors to distinguish between said up-going and said down-going wavefields;
    separating said up-going and said down-going wavefields from each other by identifying said up-going wavefields and subtracting them from said received seismic data;
    crosscorrelating said up-going wavefields and said down-going wavefields; and
    estimating an amplitude spectra of the seismic data from the result of said crosscorrelation of said up-going wavefields and said down-going wavefields.

11. A method of amplitude spectra estimation for seismic data having both up going and down going seismic waves comprising:
    separating the up going and the down going waves from each other; and
    crosscorrelating the up going and the down going waves to estimate an amplitude spectra of the seismic data.

12. An apparatus for estimating the amplitude spectra for seismic data having both up going and down going seismic waves comprising:

sorting means for separating the up going and the down going waves from each other; and means for crosscorrelating the up going and the down going waves to estimate an amplitude spectra of the seismic data.

13. An apparatus for amplitude spectra estimation of seismic data comprising:

accumulation means for gathering seismic data having up-going and down-going wavefields;

isolating means for separating said up-going and said down-going wavefields from each other;

means for crosscorrelating said up-going and said down-going wavefields; and determining means for estimating an amplitude spectra of the seismic data from the result of said crosscorrelation of said up-going and said down-going wavefields.

14. The apparatus according to claim 13 wherein said accumulation means includes pressure and particle velocity detectors to distinguish between said up-going and said down-going wavefields in the seismic data.

15. The apparatus according to claim 13 wherein said accumulation means includes means for measuring said down-going waves.

16. The apparatus according to claim 15 wherein said isolating means includes means for removing said down-going waves from the seismic data.

17. The apparatus according to claim 13 wherein said accumulation means includes means for measuring said up-going waves.

18. The apparatus according to claim 17 wherein said isolating means includes means for deleting said up-going waves from the seismic data.

19. An apparatus for estimating the amplitude spectra estimation for seismic data comprising:

gathering means for obtaining seismic data having up-going and down-going wavefields using pressure and particle velocity detectors to distinguish between said up-going and said down-going wavefields;

means for separating said up-going and said down-going wavefields from each other by identifying said up-going wavefields and subtracting them from said received seismic data;

means for crosscorrelating said up-going wavefields and said down-going wavefields; and means for estimating an amplitude spectra of the seismic data from the result of said crosscorrelation of said up-going wavefields and said down-going wavefields.

* * * * *

UNITED STATES PATENT AND TRADEMARK OFFICE
CERTIFICATE OF CORRECTION

PATENT NO.   : 6,263,285 B1
DATED        : July 17, 2001
INVENTOR(S)  : Joel Starr It is certified that error appears in the above-identified patent and that said Letters Patent is hereby corrected as shown below:

Title page,
ABSTRACT, line 17, "In the alternative, this" should read -- In an alternative embodiment, this --

Column 1,
Line 11, "waters io within" should read -- waters within --
Line 19, "downgoing are" should read -- downgoing waves are --
Line 27, "in separate" should read -- to separate --
Line 64, "wave" should read -- waves --

Column 3,
Line 8, "showing autocorrelation" should read -- showing an autocorrelation --
Line 15, "showing autocorrelation" should read -- showing an autocorrelation --
Line 55, "showing crosscorrelation" should read -- showing a crosscorrelation --

Column 4,
Line 22, "showing autocorrelation" should read -- showing an autocorrelation --
Line 28, "showing autocorrelation" should read -- showing an autocorrelation --

Column 7,
Line 65, "it is intended in the appended claims" should read -- the appended claims are intended --

Signed and Sealed this

Sixteenth Day of April, 2002

*Attest:*

*Attesting Officer*

JAMES E. ROGAN
*Director of the United States Patent and Trademark Office*